United States Patent
Martin

(10) Patent No.: US 10,506,478 B2
(45) Date of Patent: Dec. 10, 2019

(54) CELL RESELECTION USING NOT UPDATED MOBILITY INFORMATION

(71) Applicant: SONY CORPORATION, Tokyo (JP)

(72) Inventor: Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/553,462

(22) PCT Filed: Mar. 22, 2016

(86) PCT No.: PCT/EP2016/056293
§ 371 (c)(1),
(2) Date: Aug. 24, 2017

(87) PCT Pub. No.: WO2016/169714
PCT Pub. Date: Oct. 27, 2016

(65) Prior Publication Data
US 2018/0249383 A1  Aug. 30, 2018

(30) Foreign Application Priority Data
Apr. 20, 2015  (EP) .................................. 15164346

(51) Int. Cl.
*H04W 36/00* (2009.01)
(52) U.S. Cl.
CPC ... *H04W 36/0061* (2013.01); *H04W 36/0083* (2013.01)
(58) Field of Classification Search
CPC ......... H04W 36/0061; H04W 36/0068; H04W 36/08; H04W 36/10; H04W 36/24; H04W 36/0055; H04W 36/00; H04W 36/05
(Continued)

(56) References Cited

U.S. PATENT DOCUMENTS 5,915,219 A * 6/1999 Poyhonen ............. H04W 16/00
                                                         455/435.2
9,949,246 B2 * 4/2018 Li ........................ H04W 72/042
(Continued)

FOREIGN PATENT DOCUMENTS

CN       102905245 A      1/2013
EP       2 523 500 A1    11/2012
(Continued)

OTHER PUBLICATIONS

International Search Report dated Jun. 13, 2016, in PCT/EP2016/056293, filed Mar. 22, 2016.
(Continued)

Primary Examiner — Jeffrey M Rutkowski
Assistant Examiner — Luna Weissberger
(74) Attorney, Agent, or Firm — Xsensus LLP

(57) ABSTRACT

A communications device for communicating via a mobile communications network, includes a transmitter, a receiver, and a controller. The transmitter is configured to transmit signals to one or more infrastructure equipment of the mobile communications network when in a connected mode, the receiver is configured to receive signals from the infrastructure equipment, and the controller is configured to control the receiver to acquire mobility information, the mobility information providing an indication of communications parameters relating to a wireless access interface provided by one or more infrastructure equipment for receiving signals at the receiver. When in an idle mode, the controller is configured to measure signals received from at least one of the one or more infrastructure equipment using latest mobility information, and to perform a cell reselection process based on the measured signals to reselect one of the one or more infrastructure equipment, using the latest mobility information.

22 Claims, 7 Drawing Sheets

(58) Field of Classification Search
USPC ........................................................ 370/331
See application file for complete search history.

(56) References Cited

U.S. PATENT DOCUMENTS

| | | | | |
|---|---|---|---|---|
| 2014/0066072 | A1* | 3/2014 | Carlsson | H04W 36/0061 455/436 |
| 2014/0286225 | A1* | 9/2014 | Yu | H04W 4/08 370/312 |
| 2014/0295847 | A1* | 10/2014 | Futaki | H04W 36/0055 455/436 |
| 2015/0017977 | A1* | 1/2015 | Ratasuk | H04W 88/10 455/426.1 |
| 2015/0029866 | A1* | 1/2015 | Liao | H04W 4/023 370/241 |
| 2015/0289315 | A1* | 10/2015 | Ratasuk | H04W 88/10 370/312 |
| 2016/0088595 | A1* | 3/2016 | You | H04W 4/70 370/329 |
| 2016/0095030 | A1* | 3/2016 | Lindoff | H04W 48/16 370/332 |
| 2016/0119900 | A1* | 4/2016 | You | H04W 4/70 370/336 |
| 2016/0227518 | A1* | 8/2016 | Li | H04W 72/042 |

FOREIGN PATENT DOCUMENTS

| | | |
|---|---|---|
| WO | 2013/013446 A1 | 1/2013 |
| WO | 2014/185660 A1 | 11/2014 |
| WO | 2014/187468 A1 | 11/2014 |
| WO | 2016/155984 A1 | 10/2016 |

OTHER PUBLICATIONS

"Revised WI: Further LTE Physical Layer Enhancements for MTC", Ericsson, 3GPP TSG RAN Meeting # 66, RP-141865, 2014 ( 9 Pages).

Holma, et al., "LTE for UMTS OFDMA and SC-FDMA based radio access", John Wiley and Sons, 2009 ( 4 Pages).

Digital cellular telecommunications system (Phase 2+) ; Universal Mobile Telecommunications System (UMTS); LTE; Service requirements for Machine-Type Communications (MTC); Stage 1, (3GPP TS 22.368 version 11.6.0 Release 11)/ ETSI TS 122 368 V11.6.0, 2012 , (21 total pages).

"Evolved Universal Terrestrial Radio Access (E-UTRA); Radio Resource Control (RRC); Protocol Specification", (3GPP TS 36.331 version 11.4.0 Release 11)/ ETSI TS 136 331 V11.4.0, 2013, ( 350 total pages).

* cited by examiner

CELL RESELECTION USING NOT UPDATED MOBILITY INFORMATION

CROSS-REFERENCE TO RELATED APPLICATIONS

The present application is based on PCT filing PCT/EP2016/056293 filed Mar. 22, 2016 and claims priority to European Patent Application 15 164 346.7, filed in the European Patent Office on 20 Apr. 2015, the entire contents of each of which being incorporated herein by reference.

BACKGROUND

Field

The present disclosure relates to communications devices for communicating via mobile communications networks, which are configured to perform cell reselection when in an idle mode and methods of controlling communications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customer's home and periodically transmit data back to a central MTC server relating to the customer's consumption of a utility such as gas, water, electricity, and so on. Smart metering is merely one example of potential MTC device applications. Further information on characteristics of MTC-type devices can be found, for example, in the corresponding standards, such as ETSI TS 122 368 V11.6.0 (2012-09)/3GPP TS 22.368 version 11.6.0 Release 11) [2].

Whilst it can be convenient for a communications device such as an MTC-type device to take advantage of the wide coverage area provided by a third or fourth generation mobile telecommunication network there are at present disadvantages. Unlike a conventional third or fourth generation mobile device such as a smartphone, a primary driver for MTC-type communications devices will be a desire for such devices to be relatively simple and inexpensive. The type of functions typically performed by an MTC-type device (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices, which are nonetheless able to communicate using LTE-type networks.

Furthermore a fully functional communications device, such as a smartphone may be configured in a form in which the device has an impaired radio frequency function. For example a fully functioning communications device may be configured as a wearable technology device such as a smart-watch. As such a small form factor of the device can result in a reduce antenna size, which can therefore impair reception of radio signals. For such devices as well as MTC-type devices for example, a technique known as coverage extension or enhancement can be employed. Coverage extension can be achieved by repeating the transmission of the same signals representing data or signalling messages, which can be combined at a communications device to provide a simple yet robust technique for increasing a likelihood of recovering the data or signalling message.

One area where the inventors have recognised a need for new procedures concerns the acquisition of system information. In broad summary, system information, or at least some aspects of system information, in existing wireless telecommunications systems, such as LTE-based telecommunications systems, is transmitted for all communications devices in a broadcast manner. This system information is transmitted in blocks of data called Master Information Blocks (MIBs) and System Information Blocks (SIBs). In the context of coverage enhancement, it is sometimes difficult for a communications device (whether reduced capability or not) to receive large MIBs and SIBs. However, without some information, such as mobility information, a communications device may not be able to roam between cells of a mobile communications network.

SUMMARY

An example embodiment of the present technique can provide a communications device for communicating via a mobile communications network, comprising a receiver and a controller. The receiver is configured to receive signals from one or more infrastructure equipment of the mobile communications network via a wireless access interface provided by the one or more infrastructure equipment. The receiver may receive the signals when in a connected mode and may also transmit signals to one or more of the infrastructure equipment. The controller is configured to control the receiver to acquire mobility information, the mobility information providing an indication of communications parameters relating to the wireless access interface provided by the one or more infrastructure equipment for receiving signals at the receiver, and to store the mobility information as the latest mobility information in a data store. The latest mobility information may be acquired by receiving the mobility information from a first of the one or more infrastructure equipment or by scanning for signals transmitted by the one or more infrastructure equipment and using predetermined default detection thresholds. When in an idle mode the controller is configured, to detect that the communications device cannot receive updated mobility information broadcast by the first of the infrastructure equipment or any of the other one or more infrastructure equipment, and to measure signals received from at least one of the one or more infrastructure equipment using the latest mobility information stored in the data store, and to perform a cell reselection process based on the measured signals in order to reselect one of the one or more infrastructure equipment. Accordingly the communications device can perform cell reselection even when it cannot receive updated mobility information.

In some embodiments, the controller of the communications device can detect that it cannot receive updated mobility information by determining that the communications device has entered a coverage extension condition in which data is communicated with the communications device by repeated transmission of signals representing the data to extend a radio coverage provided by one or more of the infrastructure equipment. In one example mobility information is not transmitted repeatedly as part of system information which is repeated, and so the communications device cannot receive updated mobility information when in the coverage extension mode. Embodiments of the present technique therefore provide an arrangement in which mobility information can be updated when the communications device is in coverage extension mode.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
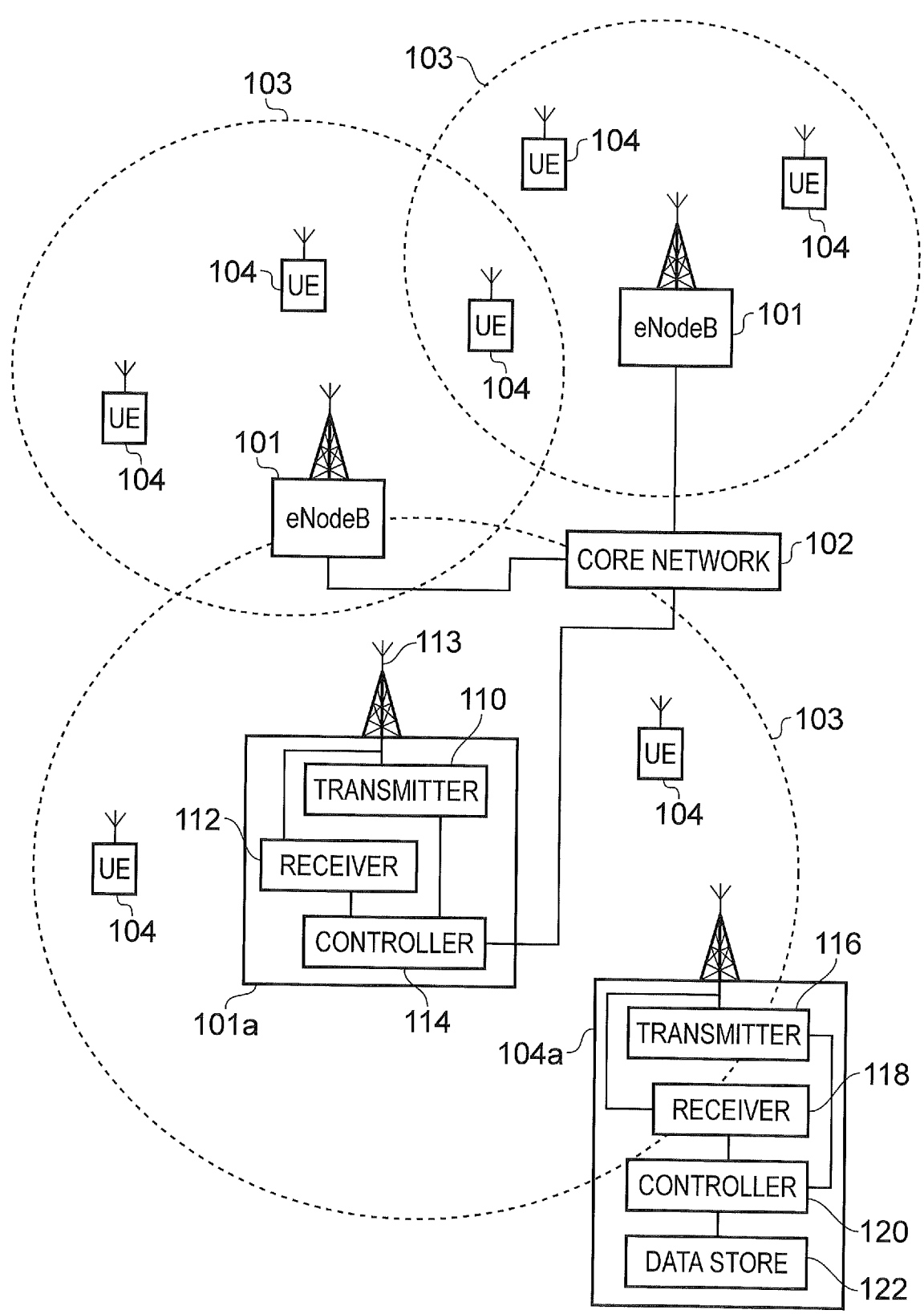
FIG. 1 schematically represents an example of a LTE-type wireless communications network.

FIG. 1 provides a schematic diagram illustrating some basic functionality of a mobile communications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a mobile communications system, where the system includes infrastructure equipment 101 which are connected to a core network 102, which operates in accordance with a conventional arrangement which will be understood by those acquainted with communications technology. The infrastructure equipment 101 may also be referred to as a base station, network element, enhanced Node B (eNodeB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices 104 served by the network entity. The mobile communications devices of FIG. 1 may also be referred to as communications devices, user equipment (UE), communications devices and so forth.

The communications system may operate in accordance with any known protocol, for instance in some examples the system may operate in accordance with a 3GPP Long Term Evolution (LTE) standard.

As shown in FIG. 1, one of the eNodeBs 101a is shown in more detail to include a transmitter 110 for transmitting signals via a wireless access interface to the one or more communications devices or UEs 104, and a receiver 112 for receiving signals from the one or more UEs within the coverage area 103. The transmitter 110 and the receiver 112 are connected to an antenna 113 for transmitting and receiving radio signals respectively. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

An example UE 104a, which can be configured in accordance with the present technique, is shown in more detail to include a transmitter 116 for transmitting signals on the uplink of the wireless access interface to the eNodeB 103 and a receiver 118 for receiving signals transmitted by the eNodeB 101 on the downlink via the wireless access interface. The transmitter 116 and the receiver 118 are controlled by a controller 120 to transmit and receive signals respectively. The controller 120 further controls a data store 122 to store data such that it can be accessed at a later time. In the example shown in FIG. 1, the UE 103a has a single antenna and therefore may co-operate with the eNodeB 101a to receive signals transmitted by the four antennas to implement a MISO scheme.

LTE Wireless Access Interface

Figure 2:
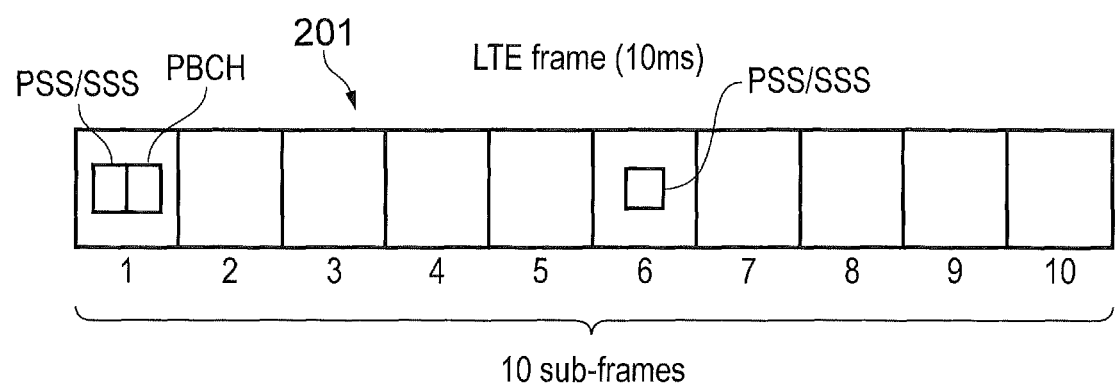
FIG. 2 schematically represents some aspects of a LTE downlink radio frame structure.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
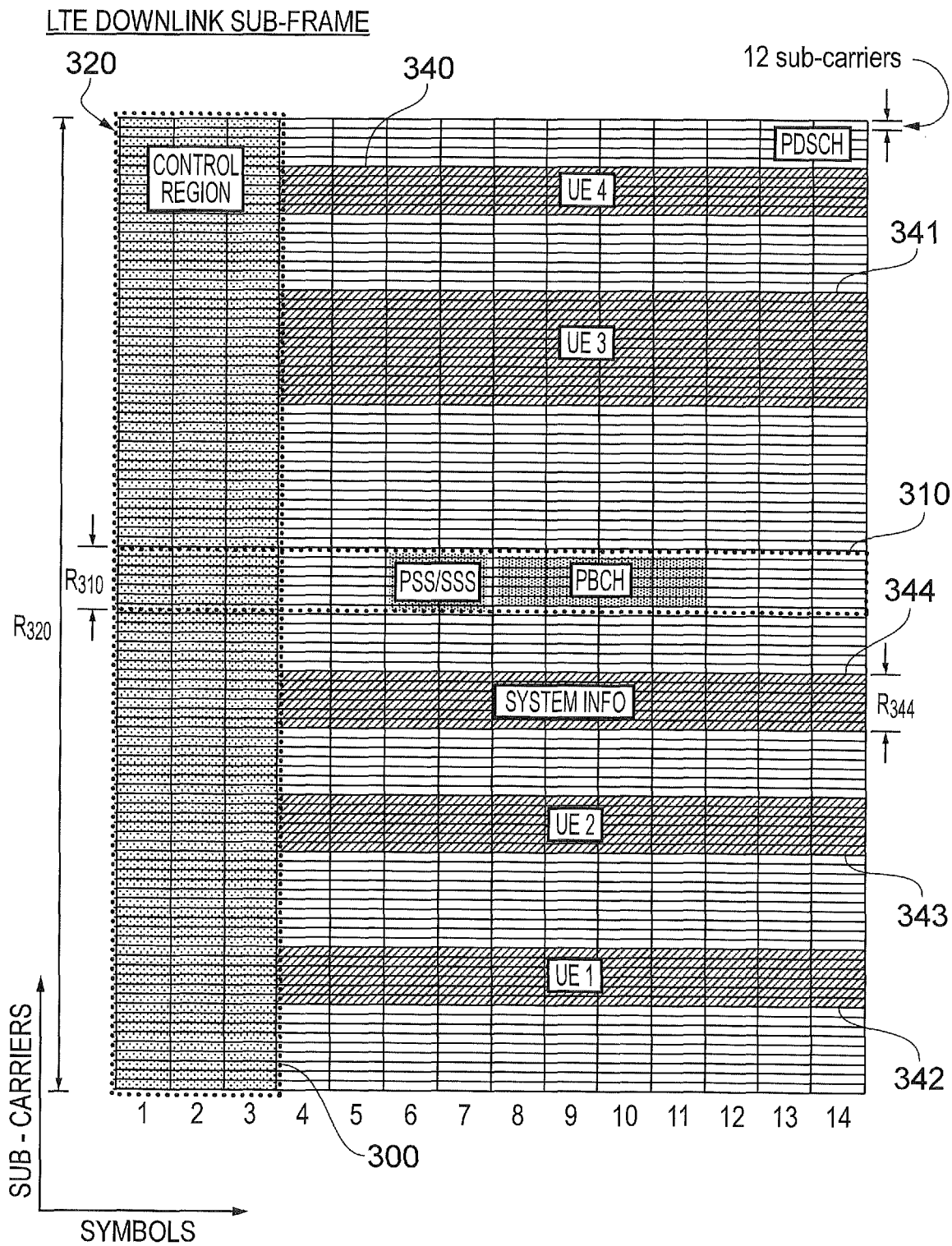
FIG. 3 schematically represents some aspects of a LTE downlink radio subframe structure.

FIG. 3 is a schematic diagram of a grid which illustrates the structure of an example conventional downlink LTE subframe (corresponding in this example to the first, i.e. left-most, subframe in the frame of FIG. 2). The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element (a resource element comprises a single symbol on a single subcarrier) is not shown, instead each individual box in the subframe grid corresponds to twelve sub-carriers transmitted on one symbol.

FIG. 3 shows resource allocations for four LTE communications devices 340, 341, 342, 343. For example, the resource allocation 342 for a first LTE communications device (UE 1) extends over five blocks of twelve sub-carriers (i.e. 60 sub-carriers), the resource allocation 343 for a second LTE communications device (UE2) extends over six blocks of twelve sub-carriers, and so on.

Control channel data is transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE communications devices. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE communications device to achieve frame synchronisation and determine the cell identity of the enhanced Node B transmitting the downlink signal. The PBCH carries information about the cell, comprising a master information block (MIB) that includes parameters that LTE communications devices use to properly access the cell. Data transmitted to individual LTE communications devices on the physical downlink shared channel (PDSCH) can be transmitted in other resource elements of the subframe.

FIG. 3 also shows a region of PDSCH containing system information and extending over a bandwidth of R344.

A conventional LTE frame will also include reference signals, which are not shown in FIG. 3 in the interests of clarity.

Master Information Block (MIB) and System Information Block (SIB)

In an LTE-based wireless telecommunications system some of the fundamental information required for a UE to operate in a cell is transmitted on PBCH in the Master Information Block (MIB). Other information regarding the system configuration is divided among System Information Blocks (SIBs) referred to as SIB1, SIB2, SIB3, etc. (There are 16 SIBs defined as of Release 11 LTE). The SIBs are transmitted in system information (SI) messages, which, apart from SIB1, may contain multiple SIBs. There may be one or several SI messages transmitted at different periodicities. Each SI message may convey multiple SIBs suitable for scheduling with the same periodicity. The timings for SIB1 transmissions are fixed on an 80 ms period and they occur in the fifth subframe of radio frames when System Frame Number (SFN) is a multiple of 8 (i.e. SFN mod 8=0). There are retransmissions of SIB1 provided in every other radio frame within the 80 ms period. The timings for other SIB transmissions are configured in SIB1. The transmission resource allocations for the SI messages on PDSCH within a subframe are provided to UEs using PDCCH allocation messages addressed to SI-RNTI (System Information Radio Network Temporary Identifier—currently 0xFFFF in LTE). At higher layers, SI is carried on the logical broadcast control channel (BCCH).

The system information in a cell may be changed, although typically this happens rarely with system information perhaps remaining unchanged for hours, days, or even weeks. Thus the mobile communications network may signal to the UEs that the system information has become invalid and needs to be re-validated.

For changes of system information other than those related to EAB (Extended Access Barring), ETWS (Earthquake Tsunami Warning System) and CMAS (Commercial Mobile Alert System), there is a BCCH modification period defined (which may be referred to as a "SI modification period"). SI modification period boundaries are defined on radio frames for which SFN mod q=0, for a cell-specific value of q. When there is a change in system information, the new system information is transmitted from the start of a new SI modification period.

The general process for implementing scheduling in system information in an LTE-based network is described, for example, in Section 5.2.1.2 of ETSI TS 136 331 V11.4.0 (2013-07)/3GPP TS 36.331 version 11.4.0 Release 11 [3]. In summary, a base station indicates a change of system information as follows.

More details on system information and scheduling in system information in an LTE-based system can be found in ETSI TS 136 331 V11.4.0 (2013-07)/3GPP TS 36.331 version 11.4.0 Release 11 [3].

Reduced Capability Devices

As discussed above, it has been proposed to reduce the complexity of an LTE modem by reducing the baseband bandwidth over which certain types of UE operate. In particular, it may be desirable to reduce at least the baseband bandwidth over which the UE is to receive PDSCH (i.e. using T-shaped allocation virtual carrier techniques). This can have the advantages of lowering the complexity of subframe buffering, post-FFT buffering, channel estimation, and turbo decoding; and lower complexity creates an opportunity for lower modem cost and also reduced operational power consumption. Low complexity modems are particularly attractive for use in machine-type communication (MTC) UEs.

Such a reduced-capability UE might, for example, be adapted to receive PDCCH across a full system bandwidth spanning n physical resource blocks (PRBs), e.g. n=50 PRBs for a system bandwidth of 10 MHz at baseband. However, the UE might be adapted to receive PDSCH in a maximum of m PRBs, where m is less than n. For example m=6, corresponding to an effective bandwidth of 1.4 MHz at baseband for PDSCH.

A reduced-capability UE can receive a system information change notification from a base station in the same way as for a conventional UE in the conventional manner discussed above. Established techniques can also be used to inform the UE of the transmission resources used for transmitting system information (i.e. the resources 568 identified in FIG. 5 as SIB PRBs).

However, an issue arises in that the reduced-capability UE may not be able to receive some of the larger SIBs. Further, in order to extend the coverage of these reduced capability devices, repetition of data in the SIB may be performed.

In co-pending European patent application number EP15161906.1, the content of which is herein incorporated by reference, various mechanisms were identified to receive some of the larger SIBs in reduced capability UEs. One approach is to send a version of the SIB for non reduced-capability UEs and a copy of the SIB specifically for UEs operating at 1.4 MHz bandwidth and/or with coverage enhancement. This may involve removing non-essential information and cutting larger blocks down. However, even with this approach, several issues were identified.

Firstly, there is not a large amount of information that can be considered as not essential. This is particularly true if the low complexity devices need to support inter-frequency mobility. This feature is important in the field of wearable technology (such as smartwatches) as the largest sized SIBs are mobility related. Secondly, it is considered by the inventors to be inefficient to broadcast the same information twice.

Figure 4:
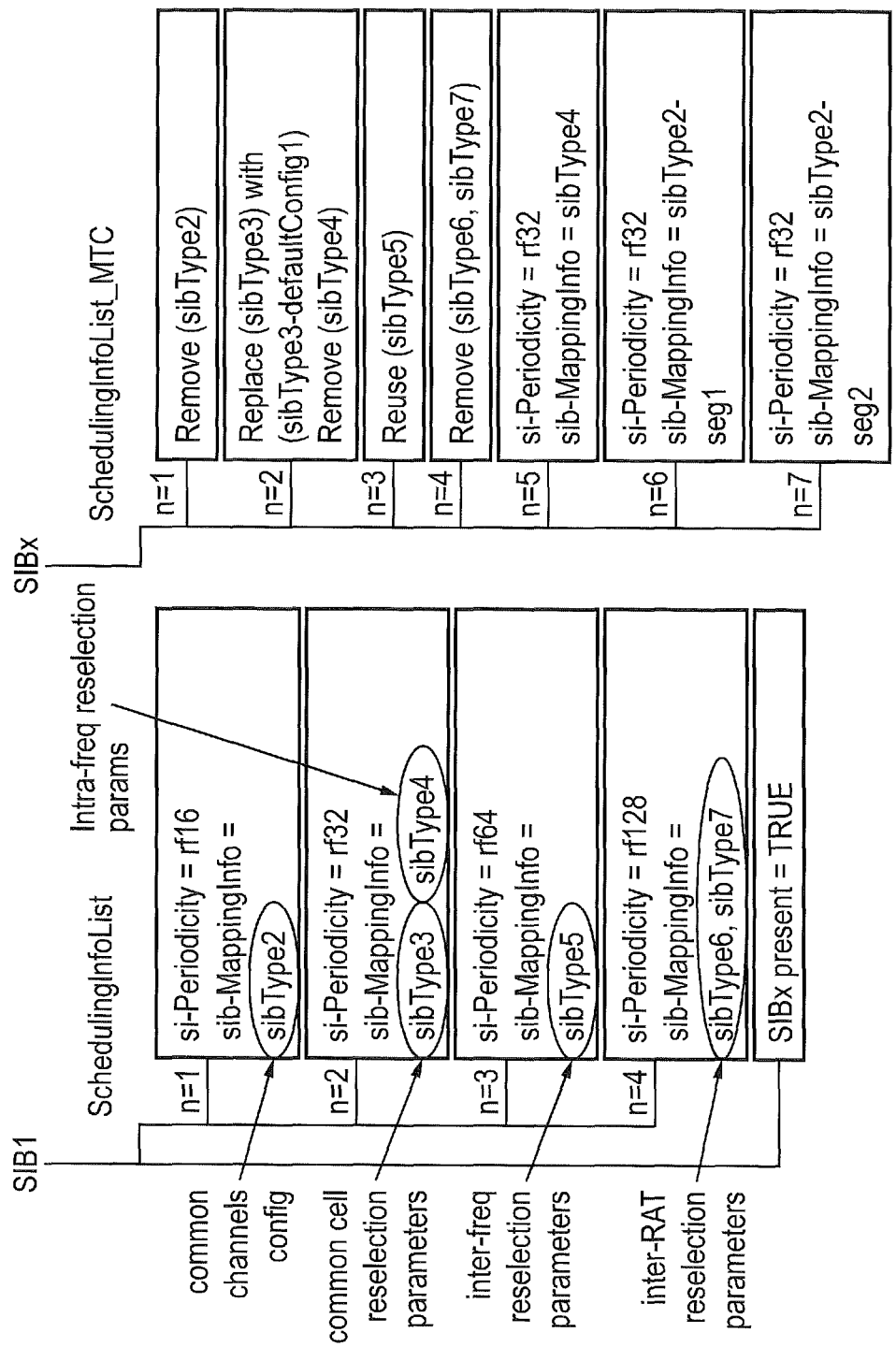
FIG. 4 schematically represents a block of system information containing scheduling information along with a first block of system information containing scheduling information.

According to EP15161906.1 [4], the scheduling information for a block of system information, such as a SIB, is provided by SchedulingInfoList. This is transmitted to the UEs in so-called "SIB1". A diagram showing the structure of SIB1 according to EP15161906.1 is shown in FIG. 4. As with a known SIB1, the SIB1 according to EP15161906.1 is transmitted to the UEs at a fixed time location. In examples, the SystemInformationBlockType1 uses a fixed schedule with a periodicity of 80 ms and repetitions made within 80 ms. The first transmission of SystemInformationBlockType1 is scheduled in subframe #5 of radio frames for which SFN mod 8=0, and repetitions are scheduled in subframe #5 of all other radio frames for which SFN mod 2=0. Of course, any appropriate time location may be used The SchedulingInfoList of the SIB1 structure according to EP15161906.1 contains the scheduling information for the other SIBs. For example, SIB2 is used to send common channel (e.g. PCCH and PRACH) configuration. SIB3 is used to send cell re-selection configuration information. This is common to inter/intra-freq and inter-RAT (for example serving cell thresholds and suitability criteria). SIB4 contains information specific to intra-frequency reselection. SIB5 contains information specific to inter-frequency reselection. SIB6 and SIB7 contain UTRAN and GERAN cell reselection information, respectively. This is similar to the known SIB structure. The order of the SIB1 structure is defined in the 3GPP TS 36.331 section 6.2.2 (SystemInformationBlockType1 Message) Standard.

The SIB1 structure according to embodiments of EP15161906.1, however, also includes a flag which indicates whether additional scheduling information in the form of a SIB designed for reduced capability UEs is included in SIB1. This flag, or a different flag, may also indicate whether additional scheduling information in the form of a SIB designed for coverage enhancement is included in SIB1. In FIG. 4, this additional SIB is identified as "SIBx" and the flag is "SIBx present=true". Of course, SIBx may relate to the SIB for reduced capability UEs and/or coverage enhancement UEs. As would be appreciated, although an explicit flag is shown in FIG. 4, in other examples, any marker (a flag or otherwise) indicating that an additional SIB is included may be located in the scheduling information with SIB1, for example, at n=5 in the numbering of FIG. 4 or may be separately included in an existing or newly defined master information block (MIB) to indicate the presence of the additional scheduling block. The marker and the newly defined scheduling may alternatively also be contained in a newly defined MIB which is separate to the existing MIB. In other words, the marker indicating the presence of SIBx is sent in the master information block (MIB) rather than SIB1. The UE then does not receive (or otherwise ignores) the scheduling information from SIB1 and instead reads only the scheduling information from SIBx.

Of course, and will be explained later, although only a single additional SIB is identified by the flag, other embodiments may include more than one additional SIB specific for reduced capability UEs. For example, one additional SIB may be provided for reduced bandwidth UEs and a second additional SIB for coverage enhancement UEs. Other embodiments may include an extension to SIB1 containing the additional scheduling information instead of, or in addition to, an additional one or more SIBs.

So, when a UE receives the SIB1 structure according to embodiments of EP15161906.1, the UE checks for the presence of the additional SIBx identified by the flag or otherwise. If the UE is a reduced capability UE, or operating in coverage enhancement mode, the UE will retrieve the SIBx appropriate for the type of reduced capability UE or the current coverage mode. However, if the UE is not a reduced capability UE, or operating in coverage enhancement mode, the UE will ignore the additional SIB and continue to process the SIB as already known. This means that the SIB1 according to embodiments of EP15161906.1 is compatible with both non capability reduced UEs, devices operating in coverage enhancement mode, and legacy devices.

If the UE is a capability-reduced UE or is operating in coverage enhancement mode and has identified the appropriate additional SIBx, the UE obtains the SchedulingInfoList from SIBx. For the sake of clarity, the SchedulingInfoList of the additional SIBx is termed "SchedulingInfoList_MTC", although any title may be appropriate.

As will be noted, SchedulingInfoList_MTC contains entries n=1 to n=4 which map to entries n=1 to n=4 of SIB1. So, the order of the scheduling information for SIB1 is the same as the order of the scheduling for SIBx where this mapping occurs. SchedulingInfoList_MTC also contains entries n=5 to n=7 which do not map to entries within SIB1. The purpose of SIBx is to provide instructions on whether and how the various entries of SIB1 (for example in FIG. 4, n=1 to n=4) should be altered by the capability reduced UE. The content and function of each of these entries within SIBx will now be explained with reference to the SIBx structure located on the right hand side of FIG. 4.

Entry n=1 of SIBx contains the term "Remove(sibType2)". This means that the reduced capability UE is instructed to remove SIB2 from the entry n=1 within SIB1 and hence no system information block will be received at n=1. Entry n=2 of SIBx contains the term "Replace (sibType3) with (sibType3-defaultConfig1) Remove (sibType4)". This means that the reduced capability UE will replace the sibType3 in entry n=2 of SIB1 and replace this with a default configuration stored within the reduced capability device. This default configuration may be pre-stored in the reduced capability device or may be transferred to the reduced capability device using some mechanism. Further, the reduced capability UE will remove (by not receiving) SIB4 from the entry n=2 within SIB1.

Entry n=3 of SIBx contains the term "Reuse(sibType5)". This means that the reduced capability UE is instructed to use the content of SIB5. This may be done using an explicit indication, or for example by omitting (leaving empty) the entry n=3 in the SchedulingInfoList_MTC. Entry n=4 of SIBx contains the term "Remove(sibType6, sibType7)". This means that the reduced capability UE will remove (i.e. not receive) SIB6 and SIB7 from entry n=4 within SIB1 and not attempt to receive those.

Entry n=5 to n=7 of SIBx do not map to SIB1. Within entry n=5 to n=7, scheduling for the replacement SIBs that have been removed from entry n=1 to n=4 or for any new (additional) SIBs is included. Specifically, in the example of FIG. 4, entry n=5 of SIBx states that SIB4 will be sent with a periodicity of 32 radio frames. In other words, compared with entry n=2 of SIB1, SIB4 in SIBx is sent on its own without being combined with SIB3. By sending a replacement for any of the mobility related system information (e.g. SIB4, SIB5) it is possible to reduce the number of signalled neighbours compared to the SIB scheduled for other devices resulting in a smaller size of system information block.

Entry n=6 and n=7 of SIBx states that SIB2 be effectively split into two parts, segment 1 and segment 2 (seg1 and seg2 of FIG. 4). Each of these segments will have a periodicity of 32 radio frames.

This splitting of a SIB (in this case SIB2) is particularly useful in instances where a device is located in a weak signal area, such as on the edge of a cell or in a basement (i.e. operating in a so called coverage enhancement mode). Typically, these devices require a SIB to be sent many times in order to receive a complete SIB. By splitting the SIB into segments means that once a segment is received, it does not need to be re-sent. This saves network resources and battery life within the UE.

The use of this additional SIB, SIBx, allows a reduced capability UE to only use and retrieve SIBs that are relevant to it. This saves battery life within the UE. Similarly, in some instances, it is not possible for the reduced capability UE to receive the SIB. In this case, the SIB may be split into many segments and retrieved, or may be simply replaced with a default configuration.

Coverage Enhancement

As noted above, SIBx may provide scheduling information for a UE (either reduced capability or not) operating in coverage enhancement mode. In order to operate in coverage enhancement mode, the SIB will need transmitting with a certain number of repetitions depending on the amount of coverage enhancement required by the UE. For example, a smart watch which may require 3 dB of coverage enhancement will need a SIB repeated fewer times than a smart meter that may require 15 dB of coverage enhancement.

Given this, it is envisaged that a cell may provide more than one level of coverage enhancement. Specifically, a cell may support normal coverage (i.e. no coverage enhancement and no repetitions of the SIB); 3 dB coverage enhancement which requires some repetitions of the SIB; and 15 dB coverage enhancement which requires more repetitions than the 3 dB coverage enhancement as would be appreciated.

Our co-pending European patent application number EP15161906.1 [4] discloses a technique for extending the reception range for a UE to receive information transmitted in a SIB (coverage extension SIB), the contents of which are incorporated herein by referenced. In order to support both 3 dB and 15 dB coverage enhancement, the SIBs used by the UE (e.g. smartwatch) (for 3 dB coverage enhancement) and the SIBs used by the smart meter (for 15 dB coverage enhancement) are separate and sent with different numbers of repetitions. The smart watch would therefore read the 3 dB coverage enhancement SIB and potentially also the 15 dB coverage enhancement SIB s and the smart meter would read only the 15 dB coverage enhancement SIB. In other words, the smart watch can read both the 3 dB coverage enhancement SIBs and the 15 dB coverage enhancements SIBs whereas the smart meter would read only the 15 dB coverage enhancement SIB. So, the UE will read the SIBs based on the capability of the UE.

Figure 5:
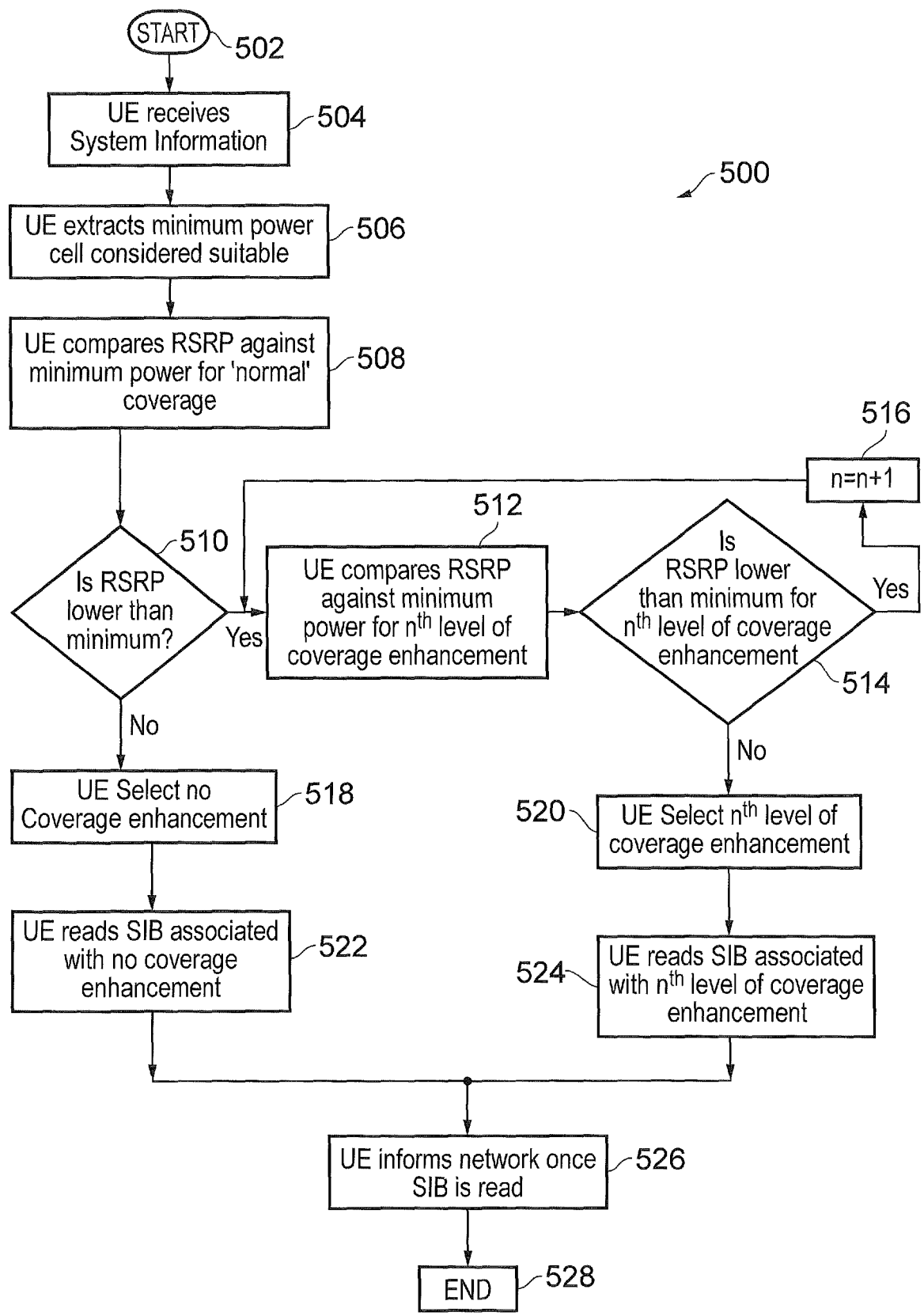
FIG. 5 shows a flow diagram illustrating an example process by which a communications device will operate in a most appropriate coverage enhancement mode.

However, the inventors recognise that reading SIBs with a high number of repetitions (or any number of repetitions)

consumes more energy than reading a SIB only once. Additionally, some SIBs may only be able to be read in 3 dB coverage enhancement mode due to the size of the block. Further, some networks provide some SIBs (for example SIB4 and SIB5 which relate to mobility) only in 3 dB coverage enhancement mode. Therefore, the inventors recognise that a UE operating in coverage enhancement mode will prefer to operate in either a lower level coverage enhancement mode or no coverage enhancement mode if possible. In other words, in the case above, a UE supporting 15 dB coverage enhancement such as a smart meter would prefer to either operate in 3 dB coverage enhancement mode or with no coverage enhancement mode. This saves energy and would be supported by more networks and could enable additional behaviour such as mobility support. Some UEs may prefer to use mobility when in a situation that only a small level of coverage enhancement is needed, but prefer to use 15 dB coverage enhancement with no mobility rather than being out of coverage altogether FIG. 5 shows a flow chart 500 explaining the process by which a UE will operate in the most appropriate coverage enhancement mode (or even no coverage enhancement mode).

The process starts in step 502. The UE receives the initial system information in 504. The system information may include a MIB and SIB and/or SIBx as appropriate. The network will provide the initial system information such that can be received by all UEs in the cell. This means that the network will provide system information that can be read by UEs operating with a maximum level of coverage enhancement.

Within the initial system information, one or more thresholds are provided. These threshold values define the minimum power (for each level of coverage enhancement) at which the cell is considered suitable. This threshold information is similar to that defined currently as the qRxLevmin which is currently provided in SIB1 for example. Of course, this is only an example and any kind of threshold identifying the minimum power at which the cell is considered suitable for each level of coverage enhancement is envisaged. The initial system information may only reference the location of further system information, with the thresholds being fixed, for example in the UE or in the standards specification.

In this specific case, SIB1 will initially provide the threshold value for normal coverage. In other words, SIB1 will include the threshold value for no coverage enhancement. Within SIB1, the remaining threshold levels for each of the supported coverage enhancement modes may also be provided. However, these values may be discrete threshold values or may be values relative to the no coverage enhancement threshold value (for example, threshold value for 3 dB coverage enhancement=threshold for no coverage enhancement−3 dB).

The UE retrieves the threshold values in step 506.

The UE then compares the measured signal strength (RSRP) against the threshold value for no coverage enhancement in step 508.

The UE determines whether the measured signal strength is lower than the threshold value for no coverage enhancement in step 510. If the result of the comparison is that the measured signal strength is lower, then the "yes" branch is followed. Otherwise, the "no" branch is followed. In the event that the "yes" branch is followed, the UE compares the measured signal strength against the threshold value for the first level of coverage enhancement. In this case, the UE compared the measured signal strength against the threshold value for the 3 dB level of coverage enhancement. This is step 512.

If the UE determines in step 514 that the measured signal strength is lower than the threshold value for the 3 dB level of coverage enhancement, the "yes" branch is followed. Otherwise, the "no" branch is followed.

In the event that the "yes" branch is followed, the next (in this case second) level of coverage enhancement will be tested. Specifically, in step 516, the next level of coverage enhancement is selected. The process repeats steps 512 and 516. In other words, the UE compares the measured signal strength against the threshold for the second level of coverage enhancement (for example 15 dB). This repeats until the measured signal strength is not less than the threshold value and then an appropriate level of coverage enhancement for that UE, and that is supported by the network, is selected. The no branch at step 514 is then followed.

When the "no" branch is followed from step 514, the process moves to step 520. The UE knows which level of coverage enhancement to use and therefore which SIB to retrieve. The selection of the appropriate level is performed in step 520 and the reading and retrieval of the appropriate SIB is performed in step 524. The reader is referred to FIGS. 6-8 regarding information explaining the selection of the SIB.

Referring back now to step 510, if the UE determines that the measured signal strength is not lower than the threshold for no coverage enhancement, the "no" branch is followed. This means that the UE will not operate using coverage enhancement and so will avoid receiving repeated SIBs thus saving energy.

The UE will select no coverage enhancement in step 518 and will read the SIB that is associated with no coverage enhancement in step 522.

Once the UE has read the appropriate SIB, the UE informs the network of the coverage enhancement mode upon which the UE operates. This may be sent using the PRACH as the UE requests certain resources from the network. Of course, other mechanisms for letting the network know such as a specific instruction sent over the air or otherwise is envisaged. This is performed in step 526. The process ends in step 528.

This process has a number of advantages. The UE can select the best level of coverage enhancement based on the UE capability and the support in the cell. By doing this energy consumption in the UE is achieved.

At the end of the process outlined in FIG. 5, the UE operates in a particular coverage enhancement mode. This process may be repeated periodically to ensure that the UE operates in the most appropriate coverage enhancement mode.

However, in the event that the measured signal strength changes before the process is repeated due to mobility of the UE, or due to the dynamic radio conditions or even due to an incorrectly identified measured signal strength, the UE may not be able to receive the appropriate SIB. In this case, the UE will automatically operate in the next level of coverage enhancement and will notify the network appropriately.

For example, if the UE operates in the 3 dB coverage enhancement mode and then suddenly the dynamic radio conditions worsen to the extent that the 3 dB coverage enhancement SIB can no longer be received, the UE will begin operating in the 15 dB coverage enhancement mode (instead of the 3 dB coverage enhancement mode) and will receive the 15 dB coverage enhancement SIB transmitted at the increased repetition rate. The UE will notify the network of the change of operation mode as noted previously in FIG. 5. It is also envisaged that failure to receive the system information may initiate repeating the process described in FIG. 5.

Although the above described the threshold values being provided by the network, it is envisaged that the threshold values may be provided to the UE by any appropriate mechanism, such as at manufacture (if the threshold values are set in a standard) or over Wi-Fi or by any appropriate means. Indeed the UE may receive an index to a table in which the threshold values are stored. This potentially means less data is transmitted if the index value is smaller than the threshold value.

As the skilled person will appreciate, the known SIB5 includes information relating to the Inter-Frequency Carrier list. This list includes the frequencies upon which neighbour cells operate. In known SIBs this can include 8 different LTE frequencies and associated other information.

Cell Reselection without Mobility Information

Embodiments of the present technique can provide an arrangement in which mobility functions are provided to a UE, when the UE is of a relatively low cost and complexity, such as a wearable device, and when the UE is in a coverage extension mode of operation. According to a conventional arrangement, when a UE enters an idle mode, then the UE is responsible for selecting which cell it should attach to so that it can receive down-link data. The UE identifies the eNodeB which is controlling the wireless access interface for that cell to which the UE should to attach receive, for example, paging and control signals from the UE. This is in contrast to when the UE is in a connected mode, in which the UE is transmitting data to or receiving data from an eNodeB. In the idle mode, the UE reports the measurements to the serving eNodeB or any of its neighbouring eNodeBs, and the serving eNodeB directs the UE to handover from one source eNodeB to a target eNodeB (network directed handover).

As explained above, there are some arrangements in which system information such as that provided via a system information block (SIB) cannot be received by a UE when in coverage extension mode. It is envisaged that a quantity of data which must be transmitted for mobility information, which provides an indication of the neighbouring eNodeBs and parameters of the wireless access interfaces such as their location, frequency band, and technology and timing information, represents too much data to be repeated in an efficient way. Accordingly, it is envisaged that mobility information cannot be conveyed via an SIB in a coverage extension mode. Nevertheless, it is desirable to provide some mobility functionality to a UE when is it in coverage extension mode.

According to the present technique, a UE operating within the mobile communications network is arranged to store a latest version of the mobility information, which the UE receives from an eNodeB, and store the latest version of the mobility information in a data store. When the UE enters a coverage extension mode of operation, and is to perform a cell reselection process in an idle mode, the UE uses the stored mobility information in order to perform the cell reselection process. As such, although that information may be out of date, because the UE may move from one coverage extension area provided by one eNodeB to a second coverage extension area provided by a second eNodeB, the UE is still able to perform measurements of neighbouring base stations and part of the wireless access interface provided by those eNodeBs or act with imperfect information. Thus, for example, even when the UE receives an indication from the network via a SIB that the current system information previously transmitted is invalid and should be revalidated, the UE does not update the latest mobility information from the data stored in its data store when in a coverage extension mode, because it cannot receive the current mobility information.

As will be appreciated, therefore, a problem arises with regard to efficiency, since coverage enhancement requires repetitions of transport blocks in order to improve the reliability of reception. Due to this, the data overheads when mobility is supported for coverage enhancement are large, and therefore in many future cases, mobility may not be supported.

There are use-cases for supporting idle mode mobility when using coverage enhancement. For example, a device which has poorer RF performance due to a low cost antenna (e.g. wearable device) may take advantage of coverage enhancement in order that the coverage is similar to that of a normal LTE device. Hence, it would be desirable to support mobility as much as possible.

Assuming that it will be decided that the overhead of sending mobility related SIBs is too large, then an alternative way to support idle mode reselection is needed.

According to an embodiment of the present disclosure, mobility related SIBs are considered optional to receive when in coverage enhancement mode. A UE may attempt to read mobility related SIBs, but if none are received then this does not delay access to the cell.

In case one or more of the SIBs are not successfully received, the UE maintains a neighbour list (intra or inter-freq) and mobility parameters in one of a number of ways. Information from a last cell or a current cell may be stored. If a UE were to reselect from another cell, then the neighbour list is stored and these parameters and frequency/cells lists are used. In case the UE moves from good coverage to extended coverage in the same cell, the UE will have obtained system information during normal coverage mode, and this system information is then stored.

The UE may transmit a request to the network to transfer the information using dedicated signalling. Currently dedicated priorities can be provided by the eNodeB upon RRC Connection release. This can be extended to provide the information normally obtained via system information (current neighbours, reselection thresholds, etc.). The UE uses this in case it is unable to read SIBs after going to idle mode. This can be based on an explicit request from the UE when entering an RRC Connected state while some SIBs have not been received, or may be always requested when the UE indicates that it is coverage enhancement capable. Additionally, this may be based on a measurement report while in the UE is in the RRC Connected state to indicate the UE will be in coverage enhanced mode when entering idle mode.

Further, the neighbour list and mobility parameters may be maintained by the UE based on autonomous measurements. If the UE does not have an inter-frequency neighbour list, the UE may scan frequencies and then monitor any frequencies that it is able to detect. Default parameters may be then used for reselection thresholds. The UE may use previously stored information about neighbours (e.g. based on past history of cells and frequencies in the area) in order to optimise this.

Only in the case that the UE is unable to perform a cell reselection based on the above method(s), then the UE triggers a cell selection procedure when it leaves the (enhanced) coverage of a cell.

Figure 6:
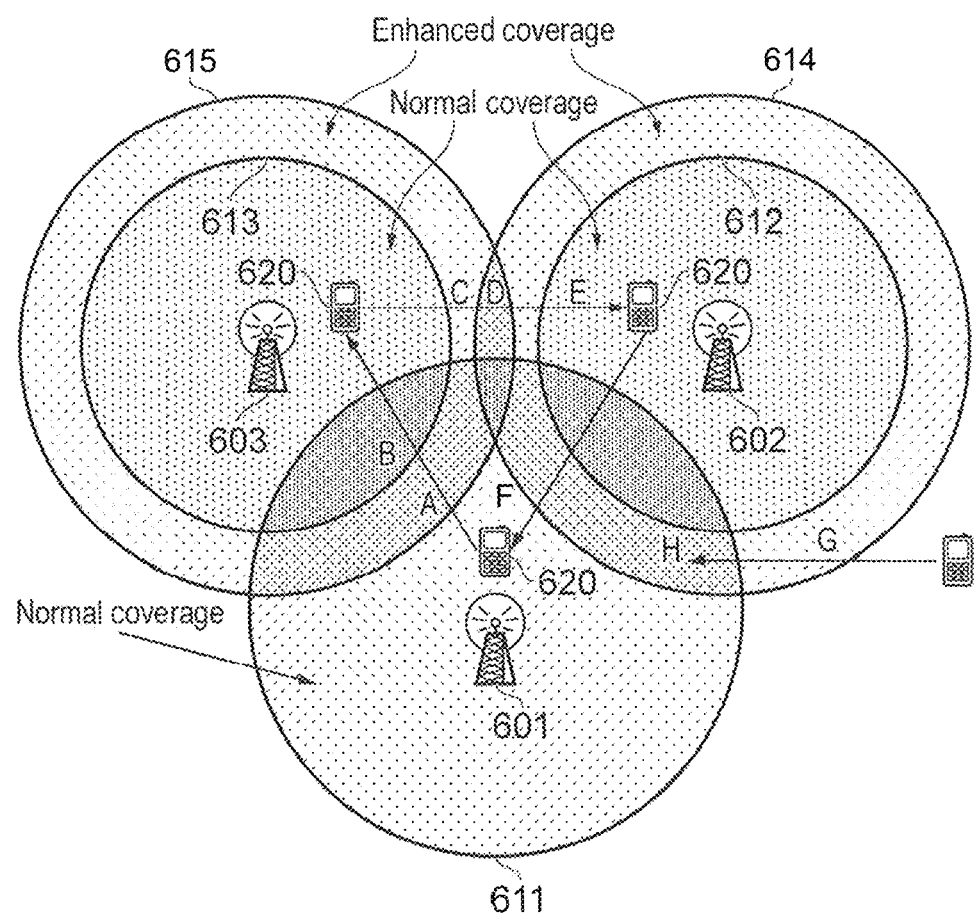
FIG. 6 shows a illustrative diagram providing a summary of cell reselection scenarios for enhanced coverage according to the present disclosure.

FIG. 6 provides an illustration of example scenarios, which illustrate embodiments of the present technique. In FIG. 6, a first eNodeB 601 is shown to provide a coverage area indicated by a bold circle 611. The bold circle within the shaded area 611 represents a coverage area in which the eNodeB 601 can provide full communications via a wireless access interface without a requirement for coverage extension. A second and third eNodeB 602, 603 are shown to provide both a normal coverage area within which radio signals can be transmitted and received with sufficient strength to communicate data with sufficient integrity without a requirement for coverage extension or enhancement. In contrast, a second circle which is concentric with the first circle 614, 615 illustrates a region in which a UE can still transmit and receive signals via the eNodeBs 602, 603. However, within this region, the third enhanced coverage region, the UE is required to operate in a coverage extension mode, in which coverage extension techniques are applied in order to transmit and receive data with a sufficient integrity. One example of the coverage extension is using a repeated transmission of data. As explained above, in some examples SIB information can be transmitted repeatedly in order to provide coverage extension. However, in accordance with a technical problem addressed by embodiments of the present technique, mobility information cannot be repeatedly transmitted because a size of a quantity of the data required would make repeated transmission an inefficient use of communications resources.

FIG. 6 illustrates examples in which the UE when throughout a coverage area represented by the mobile communications network formed for example three eNode-b's 601, 602, 603. The example movement of the UE 620 is represented by arrows which are labelled to identify different scenarios. These scenarios are summarised as follows:

A: In this case, the UE 620 moves from a cell 611 using only normal coverage mode, into the enhanced coverage region 615 of another cell. In this case, the reselection rules and parameters should ensure that the UE 620 prioritises normal coverage over enhanced coverage, and so will remain camped on the first cell 611.

B: Now the UE 620 moves into normal coverage mode of both of the cells 611 613. The reselection thresholds will cause the UE 620 to reselect to the second cell 613 once the second cell 613 meets the reselection criteria.

C: The UE 620 moves from normal coverage 613 to enhanced coverage mode 615 of this cell. UE 620 shall store the system information received in normal coverage mode 613. If the UE 620 receives notification of system information change, but is unable to obtain mobility related system information, the previously stored information is used (i.e. it is not considered invalid even after system information change has been indicated).

D: The UE 620 moves into a zone which is covered using enhanced coverage by the current cell 615 and another cell 614. The UE 620 reselects to the new cell 614, once reselection criteria is met. In case the UE 620 is unable to read mobility related system information of the new cell 614, it may store and use the previously stored information from the last cell. The neighbour list may need to be updated in order that the previous cell is now a neighbour cell and the new cell which was previously a neighbour cell is now the current cell—the parameters associated with each of the cells may also need to be updated accordingly. Alternatively, or additionally, this may be provided using dedicated signalling when the UE 620 connects to the new cell 614. Alternatively, the UE 620 may perform measurements autonomously, and apply default parameters if necessary and/or monitor detected cells.

E: The UE 620 moves from enhanced coverage 614 to normal coverage 612 of that cell. The UE 620 shall trigger reading of system information upon detecting it has moved to normal coverage 612, and information received in SIBs shall replace any stored information.

F: The UE 620 moves from a cell supporting coverage enhancement 614 to a cell 611 not supporting coverage enhancement. The UE 620 uses normal reselection procedure.

G: The UE 620 moves from being completely out of coverage into a coverage-enhanced region of a cell 614, or selects the cell using cell selection procedure (e.g. at power on). Only in case the UE 620 was previously camped on a cell which indicated this cell 614 as a neighbour can the UE 620 re-use the stored information (the UE 620 might have re-entered coverage after a coverage hole, for example) Otherwise the UE 620 needs to either obtain the information via dedicated signalling, or use autonomous measurements in order to determine which cells and frequencies to monitor.

H: The UE 620 moves from the coverage enhanced region 614 of a cell into another cell 611. If the UE 620 was able to obtain the reselection information in the previous step, then the UE 620 may reselect to the new cell 611. Otherwise the UE 620 eventually loses coverage of the coverage enhanced cell 614, and performs cell selection.

Summary of Operation

Figure 7:
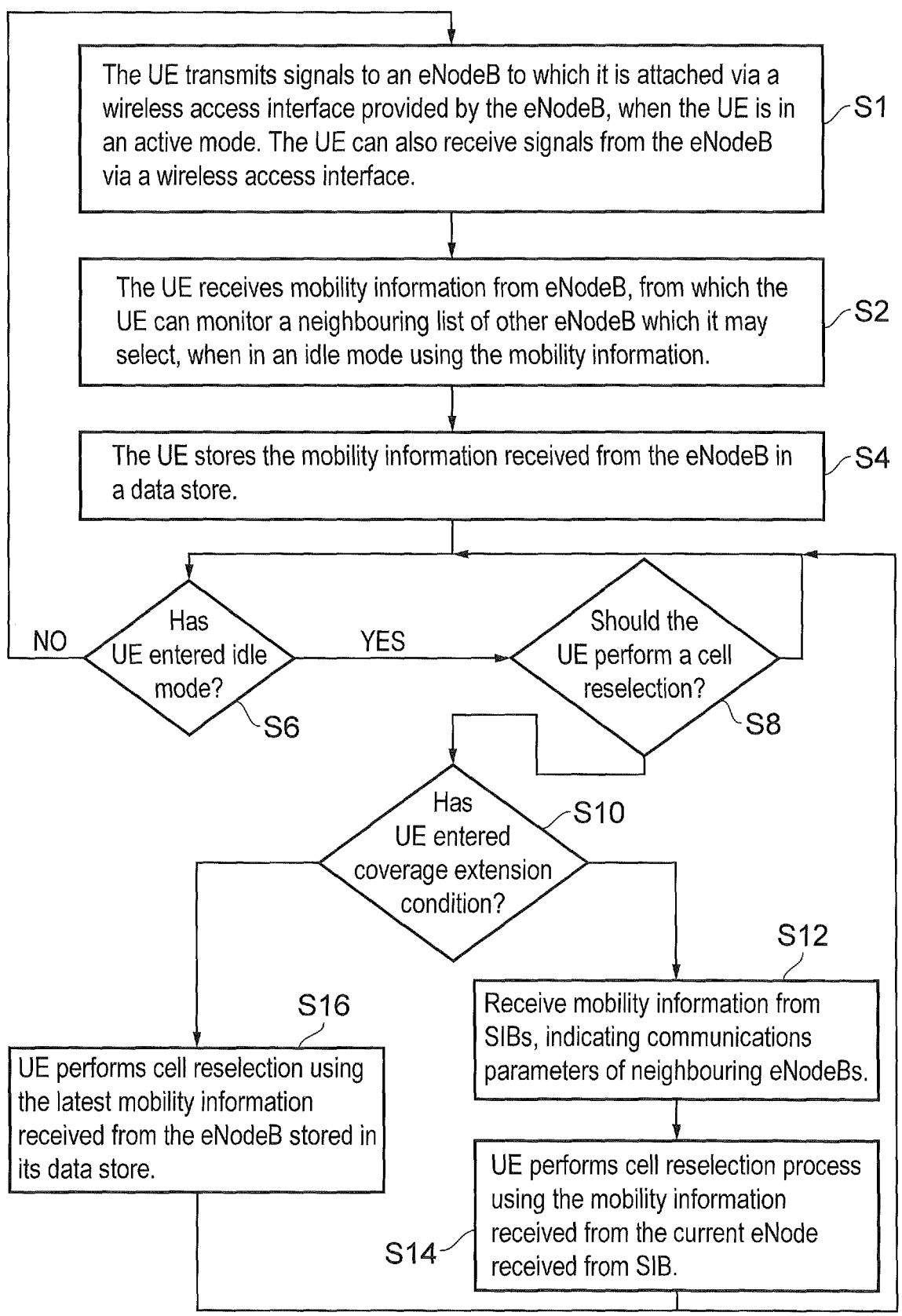
FIG. 7 shows a flow diagram providing an example embodiment of a process of cell reselection according to the present disclosure.

An example operation of an embodiment of the present technique is represented by the process illustrated by the flow diagram shown in FIG. 7. The process shown in FIG. 7 is summarised as follows:

S1: The UE transmits and receives signals via an eNodeB in a conventional way, and when the UE is attached to the eNodeB the UE transmits and receives data via a wireless access interface provided by the UE when the UE is in an active mode. As indicated above, in accordance with a conventional operation, when the UE is in an active mode, the network directs the UE to handover from one eNodeB to another, based on measurements performed by the UE and reported back to the eNodeB.

S2: At some point during a process in which the UE roams throughout a mobile coverage area provided by a mobile radio network, the UE is camped on a cell and therefore whilst within a normal coverage area, can receive mobility information broadcast from the eNodeB. The mobility information provides parameters about wireless access interfaces or the same wireless access interface provided by the current cell and neighbouring cells identifying frequency bands and synchronisation information as appropriate for the UE in order for the UE to measure signals received from neighbouring cells. This is so that when the UE is in an idle mode, the UE can perform cell reselection in order to identify the most appropriate cell to receive control information such as paging messages.

S4: The UE stores the mobility information it receives from the eNodeB in a data store. This information may be received from the broadcast channel on the current cell on which it is camped, or from the eNodeB to which it is attached in an active mode, but may be communicated by an eNodeB on request by the UE when the UE is in an extended coverage area.

S6: The UE then determines whether or not it is in an idle mode in that it has no data to transmit or receive from the mobile radio network. If the UE is not in idle mode then the UE is in an active mode and therefore processing proceeds from step S1.

S8: If the UE is in an idle mode, then in accordance with predetermined conditions, the UE may perform a cell reselection. If the UE determines that it should not perform a cell reselection, then processing proceeds back to step S6.

S10: If the UE wishes to perform the cell reselection process, then the UE determines whether it has entered a coverage extension mode as a result of coverage extension conditions being satisfied. For example, if a signal strength of a received SIB is above a threshold which indicates that UE can communicate normally via a normal coverage mode, then the UE determines that it is not in a extension coverage mode. However, if a received signal strength of an SIB is below a threshold in which normal coverage can be performed but above a lower threshold which indicates that the UE can operate in a coverage extension mode, then the UE determines that it has entered a coverage extension mode. If the UE determines that it has not entered a coverage extension mode, then processing proceeds to step S12, otherwise processing proceeds to step S16.

S12: The UE can receive updated mobility information from the SIBs providing communications parameters of neighbouring eNodeBs, when not in coverage extension mode so that the UE can perform in step S14 a cell reselection process by measuring signals received from those neighbouring eNodeBs using the updated communications parameters.

S16: If, however, the UE is in a coverage extension mode, then the UE cannot receive updated communications parameters and so performs a cell reselection using the latest mobility information received from the eNodeB, which has been stored in its data store received from the current cell or a previous cell. Thus, even if the UE is instructed to revalidate the mobility information via receiving new or updated SIBs, or reselects to a new cell using coverage extension mode, and the mobility information is not available in a coverage extension mode, the UE reuses the mobility information currently available in the data store.

The present disclosure provides an advantageous effect in that it enables a UE to perform cell reselection in coverage enhanced mode even when mobility related system information is not available, or is not received. This allows the reduction of "out of coverage" time, and caters for improved service.

Embodiments of the present disclosure can be exemplified by the following numbered paragraphs:

Paragraph: 1. A communications device for communicating via a mobile communications network, the communications device comprising
a receiver configured to receive signals from one or more infrastructure equipment of the mobile communications network via a wireless access interface provided by the one or more infrastructure equipment, and
a controller configured to control the receiver
to acquire mobility information, the mobility information providing an indication of communications parameters relating to the wireless access interface provided by the one or more infrastructure equipment for receiving signals at the receiver, and the controller is configured
to store the mobility information as the latest mobility information in a data store,
to detect that the communications device cannot receive updated mobility information broadcast by the first of the infrastructure equipment or any of the other one or more infrastructure equipment, and
when in an idle mode,
to measure signals received from at least one of the one or more infrastructure equipment using the latest mobility information stored in the data store, and
to perform a cell reselection process based on the measured signals in order to reselect one of the one or more infrastructure equipment, using the latest mobility information stored in the data store.

Paragraph: 2. A communications device as claimed in claim 1, wherein the controller is configured with the receiver
to detect that the communications device cannot receive updated mobility information by determining that the communications device has entered a coverage extension condition in which data is communicated with the communications device by repeated transmission of signals representing the data to extend a radio coverage provided by one or more of the infrastructure equipment.

Paragraph: 3. A communications device as claimed in claim 1 or 2, wherein the controller is configured in combination with the receiver
to detect that system information received from a infrastructure equipment relating the wireless access interface has become invalid,
to determine that the communications device is in a coverage extension mode for signals received from the first infrastructure equipment, for which updated mobility information cannot be received as part of the system information, and
to reuse the latest mobility information received from the first infrastructure equipment when in the coverage extension mode.

Paragraph: 4. A communications device as claimed in claim 1 or 2, wherein the controller is configured in combination with the receiver
to detect that system information received from a first of the one or more infrastructure equipment relating the wireless access interface has become invalid,
to determine that the communications device is in a coverage extension mode for signals received from a second infrastructure equipment of the one or more infrastructure equipment, for which updated mobility information cannot be received as part of the system information, and
to reuse the latest mobility information received from the first infrastructure equipment when in the coverage extension mode.

Paragraph: 5. A communications device as claimed in claim 4, wherein the controller is configured
to detect that the communications device can receive signals from the second infrastructure equipment in a coverage extension mode in which updated mobility information cannot be received by the communications device from the second infrastructure equipment,
to form a list of the one or more infrastructure equipment as candidates for reselection using the latest mobility information stored in the data store, the list being formed to include an indication the second infrastructure equipment as a current cell and the first infrastructure equipment as a neighbouring cell.

Paragraph: 6. A communications device as claimed in claim 1, wherein the controller is configured to control the receiver to receive system information provided in system information block transmitted repeatedly to extend a radio coverage of a cell served by the infrastructure equipment, wherein the mobility information is not transmitted repeatedly with the system information so that the receiver cannot receive the updated mobility information when in a coverage extension mode.

Paragraph: 7. A communications device as claimed in claim 1, wherein the controller is configured with the transmitter and the receiver to request from the first infrastructure equipment the updated mobility information, to receive in response to the request the updated mobility information, and to store the received updated mobility information in the data store as the latest mobility information.

Paragraph: 8. A communications device as claimed in 1, wherein the controller is configured with the receiver to scan for signals transmitted by the one or more infrastructure equipment, to detect a plurality of the one or more infrastructure equipment as candidates for reselection, to form updated mobility information from the detected candidate infrastructure equipment, to store the updated mobility information as the latest mobility information in the data store, and to use the updated mobility information for measuring the signals received from the candidate infrastructure equipment using the latest mobility information stored in the data store, and performing the cell reselection process based on the measured signals.

Paragraph: 9. A communications device as claimed in claim 8, wherein the controller is configured to detect that the receiver cannot receive signals from one of more of the infrastructure equipment identified by the latest mobility information stored in the data store, and if the receiver cannot receive the signals from the identified infrastructure equipment, to scan for the signals transmitted by the one or more infrastructure equipment, to detect the plurality of the one or more infrastructure equipment as candidates for reselection.

Paragraph: 10. A communications device as claimed in claim 1, wherein the controller is configured with the receiver to acquire the latest mobility information by scanning for signals transmitted by the one or more infrastructure equipment, detecting one or more of the infrastructure equipment as candidates for reselection using predetermined signal detection thresholds, and forming the latest mobility information from the one or more detected candidate infrastructure equipment.

Paragraph: 11. A communications device as claimed in claim 1, wherein the controller is configured with the receiver to acquire the latest mobility information by receiving the latest mobility information which has been broadcast by a first of the one or more infrastructure equipment.

Paragraph: 12. A method of controlling a communications device for communicating via a mobile communications network, the method comprising transmitting signals from the communications device to one or more infrastructure equipment of the mobile communications network via a wireless access interface provided by the one or more infrastructure equipment when in a connected mode, and receiving signals from the infrastructure equipment via the wireless access interface, wherein the receiving comprises acquiring mobility information, the mobility information providing an indication of communications parameters relating to the wireless access interface provided by the one or more infrastructure equipment for receiving signals at the receiver, storing the mobility information as the latest mobility information in a data store, detecting that the communications device cannot receive updated mobility information broadcast by the first of the infrastructure equipment or any of the other one or more infrastructure equipment, and when in an idle mode, measuring signals received from at least one of the one or more infrastructure equipment using the latest mobility information stored in the data store, and performing a cell reselection process based on the measured signals in order to reselect one of the one or more infrastructure equipment, using the latest mobility information stored in the data store.

Paragraph: 13. A method as claimed in claim 12, wherein the detecting that the communications device cannot receive updated mobility information comprises determining that the communications device has entered a coverage extension condition in which data is communicated with the communications device by repeated transmission of signals representing the data to extend a radio coverage provided by one or more of the infrastructure equipment.

Paragraph: 14. A method as claimed in claim 12 or 13, the method comprising detecting that system information received from the infrastructure equipment relating the wireless access interface has become invalid, determining that the communications device is in a coverage extension mode for signals received from the first infrastructure equipment, for which updated mobility information cannot be received as part of the system information, and reusing the latest mobility information received from the first infrastructure equipment when in the coverage extension mode.

Paragraph: 15. A method as claimed in claim 14, the method comprising detecting that system information received from the first of the one or more infrastructure equipment relating the wireless access interface has become invalid, determining that the communications device is in a coverage extension mode for signals received from a second infrastructure equipment of the one or more infrastructure equipment, for which updated mobility information cannot be received as part of the system information, and reusing the latest mobility information received from the first infrastructure equipment when in the coverage extension mode.

Paragraph: 16. A method as claimed in claim 15, wherein the detecting that the communications device cannot receive updated mobility information broadcast by the first of the infrastructure equipment or any of the other one or more infrastructure equipment comprises detecting that the communications device can receive signals from the second infrastructure equipment in a coverage extension mode in which updated mobility information cannot be received by the communications device from the second infrastructure equipment, and the performing the reselection process based on the measured signals comprises forming a list of the one or more infrastructure equipment as candidates for reselection using the latest mobility information stored in the data store, the list being formed to include an indication the second infrastructure equipment as a current cell and the first infrastructure equipment as a neighbouring cell.

Paragraph: 17. A method as claimed in claim 13, comprising
receiving system information provided in a system information block transmitted repeatedly to extend a radio coverage of a cell served by the infrastructure equipment, wherein the mobility information is not transmitted repeatedly with the system information so that the updated mobility information cannot be received when in a coverage extension mode.

Paragraph: 18. A method as claimed in claim 12, the method comprising
determining that the communications device has entered the coverage extension mode by comparing a strength of signals received with a predetermined threshold.

Paragraph: 19. A method as claimed in claim 12, the method comprising
requesting from the first infrastructure equipment the mobility information,
receiving in response to the request the mobility information, and
storing the received mobility information in the data store as the latest mobility information.

Paragraph: 20. A method as claimed in claim 12, wherein the acquiring the latest mobility information comprises
scanning for signals transmitted by the one or more infrastructure equipment,
detecting a plurality of the one or more infrastructure equipment as candidates for reselection using predetermined signal detection thresholds, and
forming the latest mobility information from the one or more detected candidate infrastructure equipment.

Paragraph: 21. A method as claimed in claim 12, wherein the acquiring the latest mobility information comprises
receiving the latest mobility information which has been broadcast by a first of the one or more infrastructure equipment.

REFERENCES

[1] Holma H. and Toskala A, "LTE for UMTS OFDMA and SC-FDMA based radio access", John Wiley and Sons, 2009
[2] ETSI TS 122 368 V11.6.0 (2012-09)/3GPP TS 22.368 version 11.6.0 Release 11
[3] ETSI TS 136 331 V11.4.0 (2013-07)/3GPP TS 36.331 version 11.4.0 Release 11
[4] EP15161906.1

The invention claimed is:

1. A communications device for communicating via a mobile communications network, the communications device comprising:
a transmitter configured to transmit signals to one or more infrastructure equipment of the mobile communications network via a wireless access interface provided by the one or more infrastructure equipment when in a connected mode;
a receiver configured to receive signals from the one or more infrastructure equipment via the wireless access interface; and
a controller configured to control the receiver to acquire mobility information, the mobility information providing an indication of communications parameters relating to the wireless access interface provided by the one or more infrastructure equipment for receiving signals at the receiver, and the controller is further configured to store the mobility information as the latest mobility information in a data store,
to detect that the communications device cannot receive updated mobility information broadcast by a first of the one or more infrastructure equipment or any of the other one or more infrastructure equipment when a location of the communications device is changed from being completely out of coverage into a coverage enhanced region of the first of the one or more infrastructure equipment, and
when in an idle mode and the controller detects that the communication device cannot receive the updated mobility information based on the changed location
to measure signals received from at least one of the one or more infrastructure equipment using the latest mobility information stored in the data store, and
to perform a cell reselection process based on the measured signals in order to reselect one of the one or more infrastructure equipment, using the latest mobility information stored in the data store, only when the communication device previously received mobility information from a third of the one or more infrastructure equipment that is a neighbor of the first of the one or more infrastructure equipment.

2. The communications device as claimed in claim 1, wherein the controller is configured with the receiver
to detect that the communications device cannot receive updated mobility information by determining that the communications device has entered a coverage extension condition in which data is communicated with the communications device by repeated transmission of signals representing the data to extend a radio coverage provided by one or more of the one or more infrastructure equipment.

3. The communications device as claimed in claim 1, wherein the controller is configured in combination with the receiver
to detect that system information received from a infrastructure equipment relating the wireless access interface has become invalid,
to determine that the communications device is in a coverage extension mode for signals received from the first infrastructure equipment, for which updated mobility information cannot be received as part of the system information, and
to reuse the latest mobility information received from the first infrastructure equipment when in the coverage extension mode.

4. The communications device as claimed in claim 1, wherein the controller is configured in combination with the receiver
to detect that system information received from a first of the one or more infrastructure equipment relating the wireless access interface has become invalid,
to determine that the communications device is in a coverage extension mode for signals received from a second infrastructure equipment of the one or more infrastructure equipment, for which updated mobility information cannot be received as part of the system information, and
to reuse the latest mobility information received from the first infrastructure equipment when in the coverage extension mode.

5. The communications device as claimed in claim 4, wherein the controller is configured
to detect that the communications device can receive signals from the second infrastructure equipment in a coverage extension mode in which updated mobility information cannot be received by the communications device from the second infrastructure equipment,
to form a list of the one or more infrastructure equipment as candidates for reselection using the latest mobility information stored in the data store, the list being formed to include an indication the second infrastructure equipment as a current cell and the first infrastructure equipment as a neighbouring cell.

6. The communications device as claimed in claim 1, wherein the controller is configured to control the receiver to receive system information provided in system information block transmitted repeatedly to extend a radio coverage of a cell served by the one or more infrastructure equipment, wherein the mobility information is not transmitted repeatedly with the system information so that the receiver cannot receive the updated mobility information when in a coverage extension mode.

7. The communications device as claimed in claim 1, wherein the controller is configured with the transmitter and the receiver
to request from the first infrastructure equipment the updated mobility information,
to receive in response to the request the updated mobility information, and
to store the received updated mobility information in the data store as the latest mobility information.

8. The communications device as claimed in claim 1, wherein the controller is configured with the receiver
to scan for signals transmitted by the one or more infrastructure equipment, to detect a plurality of the one or more infrastructure equipment as candidates for reselection,
to form updated mobility information from the detected candidate infrastructure equipment,
to store the updated mobility information as the latest mobility information in the data store, and
to use the updated mobility information for measuring the signals received from the candidate infrastructure equipment using the latest mobility information stored in the data store, and performing the cell reselection process based on the measured signals.

9. The communications device as claimed in claim 8, wherein the controller is configured
to detect that the receiver cannot receive signals from one of more of the one or more infrastructure equipment identified by the latest mobility information stored in the data store, and if the receiver cannot receive the signals from the identified infrastructure equipment,
to scan for the signals transmitted by the one or more infrastructure equipment, to detect the plurality of the one or more infrastructure equipment as candidates for reselection.

10. The communications device as claimed in claim 1, wherein the controller is configured with the receiver to acquire the latest mobility information by
scanning for signals transmitted by the one or more infrastructure equipment,
detecting one or more of the one or more infrastructure equipment as candidates for reselection using predetermined signal detection thresholds, and
forming the latest mobility information from the one or more detected candidate infrastructure equipment.

11. The communications device as claimed in claim 1, wherein the controller is configured with the receiver to acquire the latest mobility information by receiving the latest mobility information which has been broadcast by a first of the one or more infrastructure equipment.

12. A method of controlling a communications device for communicating via a mobile communications network, the method comprising:
transmitting signals from the communications device to one or more infrastructure equipment of the mobile communications network via a wireless access interface provided by the one or more infrastructure equipment when in a connected mode; and
receiving signals from the one or more infrastructure equipment via the wireless access interface, wherein the receiving comprises
acquiring mobility information, the mobility information providing an indication of communications parameters relating to the wireless access interface provided by the one or more infrastructure equipment for receiving signals at the receiver,
storing the mobility information as the latest mobility information in a data store,
detecting that the communications device cannot receive updated mobility information broadcast by a first of the one or more infrastructure equipment or any of the other one or more infrastructure equipment when a location of the communications device is changed from being completely out of coverage into a coverage enhanced region of the first of the one or more infrastructure equipment, and
when in an idle mode and the detecting detects that the communication device cannot receive the updated mobility information based on the changed location
measuring signals received from at least one of the one or more infrastructure equipment using the latest mobility information stored in the data store, and
performing a cell reselection process based on the measured signals in order to reselect one of the one or more infrastructure equipment, using the latest mobility information stored in the data store, only when the communication device previously received mobility information from a third of the one or more infrastructure equipment that is a neighbor of the first of the one or more infrastructure equipment.

13. The method as claimed in claim 12, wherein the detecting that the communications device cannot receive updated mobility information comprises
determining that the communications device has entered a coverage extension condition in which data is communicated with the communications device by repeated transmission of signals representing the data to extend a radio coverage provided by one or more of the one or more infrastructure equipment.

14. The method as claimed in claim 12, the method comprising
detecting that system information received from the one or more infrastructure equipment relating the wireless access interface has become invalid,
determining that the communications device is in a coverage extension mode for signals received from the first infrastructure equipment, for which updated mobility information cannot be received as part of the system information, and
reusing the latest mobility information received from the first infrastructure equipment when in the coverage extension mode.

15. The method as claimed in claim 14, the method comprising detecting that system information received from the first of the one or more infrastructure equipment relating the wireless access interface has become invalid, determining that the communications device is in a coverage extension mode for signals received from a second infrastructure equipment of the one or more infrastructure equipment, for which updated mobility information cannot be received as part of the system information, and reusing the latest mobility information received from the first infrastructure equipment when in the coverage extension mode.

16. The method as claimed in claim 15, wherein the detecting that the communications device cannot receive updated mobility information broadcast by the first of the one or more infrastructure equipment or any of the other one or more infrastructure equipment comprises detecting that the communications device can receive signals from the second infrastructure equipment in a coverage extension mode in which updated mobility information cannot be received by the communications device from the second infrastructure equipment, and the performing the reselection process based on the measured signals comprises forming a list of the one or more infrastructure equipment as candidates for reselection using the latest mobility information stored in the data store, the list being formed to include an indication the second infrastructure equipment as a current cell and the first infrastructure equipment as a neighbouring cell.

17. The method as claimed in claim 13, comprising receiving system information provided in a system information block transmitted repeatedly to extend a radio coverage of a cell served by the one or more infrastructure equipment, wherein the mobility information is not transmitted repeatedly with the system information so that the updated mobility information cannot be received when in a coverage extension mode.

18. The method as claimed in claim 12, the method comprising determining that the communications device has entered the coverage extension mode by comparing a strength of signals received with a predetermined threshold.

19. The method as claimed in claim 12, the method comprising requesting from the first infrastructure equipment the mobility information, receiving in response to the request the mobility information, and storing the received mobility information in the data store as the latest mobility information.

20. The method as claimed in claim 12, wherein the acquiring the latest mobility information comprises scanning for signals transmitted by the one or more infrastructure equipment, detecting a plurality of the one or more infrastructure equipment as candidates for reselection using predetermined signal detection thresholds, and forming the latest mobility information from the one or more detected candidate infrastructure equipment.

21. The method as claimed in claim 12, wherein the acquiring the latest mobility information comprises receiving the latest mobility information which has been broadcast by a first of the one or more infrastructure equipment.

22. A communications device for communicating via a mobile communications network, the communications device comprising a controller configured to control a receiver to acquire mobility information, the mobility information providing an indication of communications parameters relating to a wireless access interface provided by the one or more infrastructure equipment for receiving signals at the receiver, and the controller is configured to store the mobility information as the latest mobility information in a data store, and when in an idle mode, to measure signals received from at least one of the one or more infrastructure equipment using the latest mobility information stored in the data store, in response to the receiver being unable to detect mobility information broadcast by one of the one or more infrastructure equipment when a location of the communications device is changed from being completely out of coverage into a coverage enhanced region of the first of the one or more infrastructure equipment, and to perform a cell reselection process to reselect one of the one or more infrastructure equipment, using the latest mobility information stored in the data store, only when the communication device previously received mobility information from a third of the one or more infrastructure equipment that is a neighbor of the first of the one or more infrastructure equipment.

* * * * *